Figure 1:
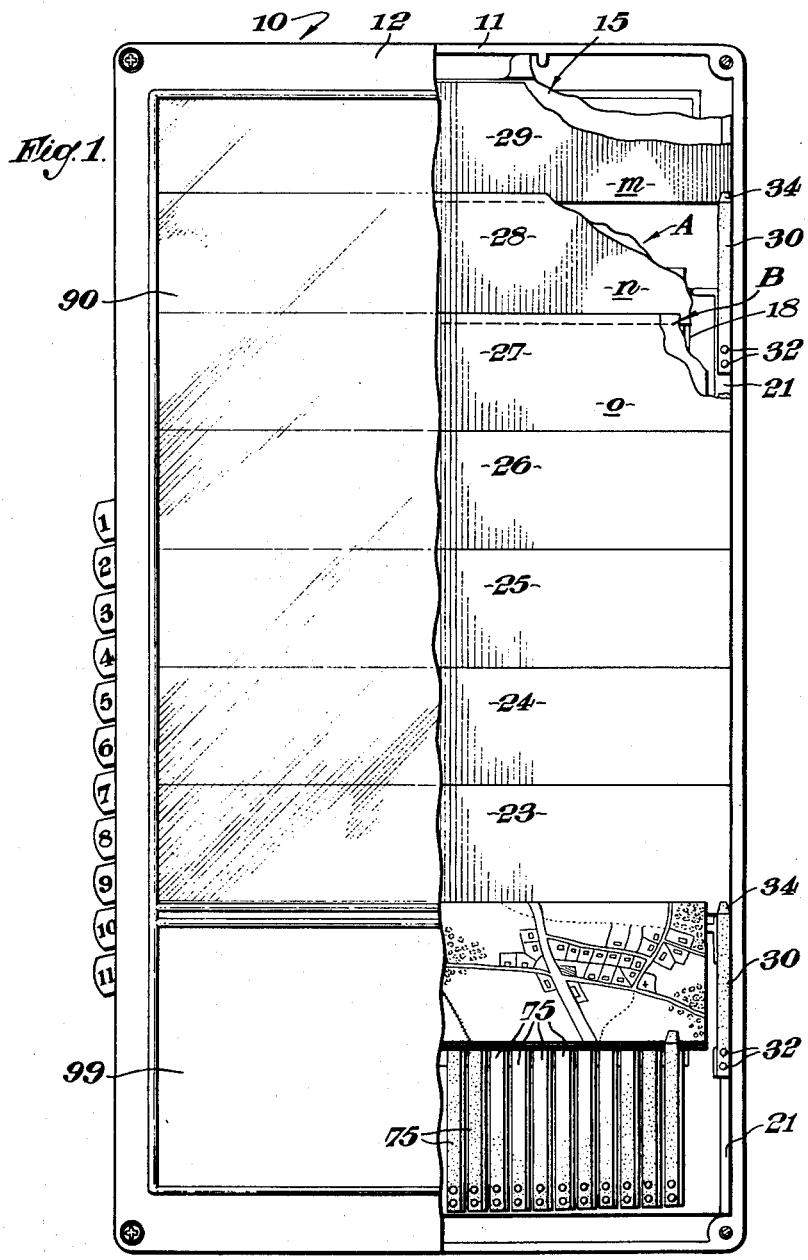

June 29, 1965     I. LUCAS     3,191,326
AUTOMATIC MAPS

Filed May 21, 1963     3 Sheets-Sheet 1

INVENTOR
BY    IMRE LUCAS
ATTORNEY

INVENTOR
IMRE LUCAS
BY John W. Pease
ATTORNEY

June 29, 1965     I. LUCAS     3,191,326
AUTOMATIC MAPS
Filed May 21, 1963     3 Sheets-Sheet 3
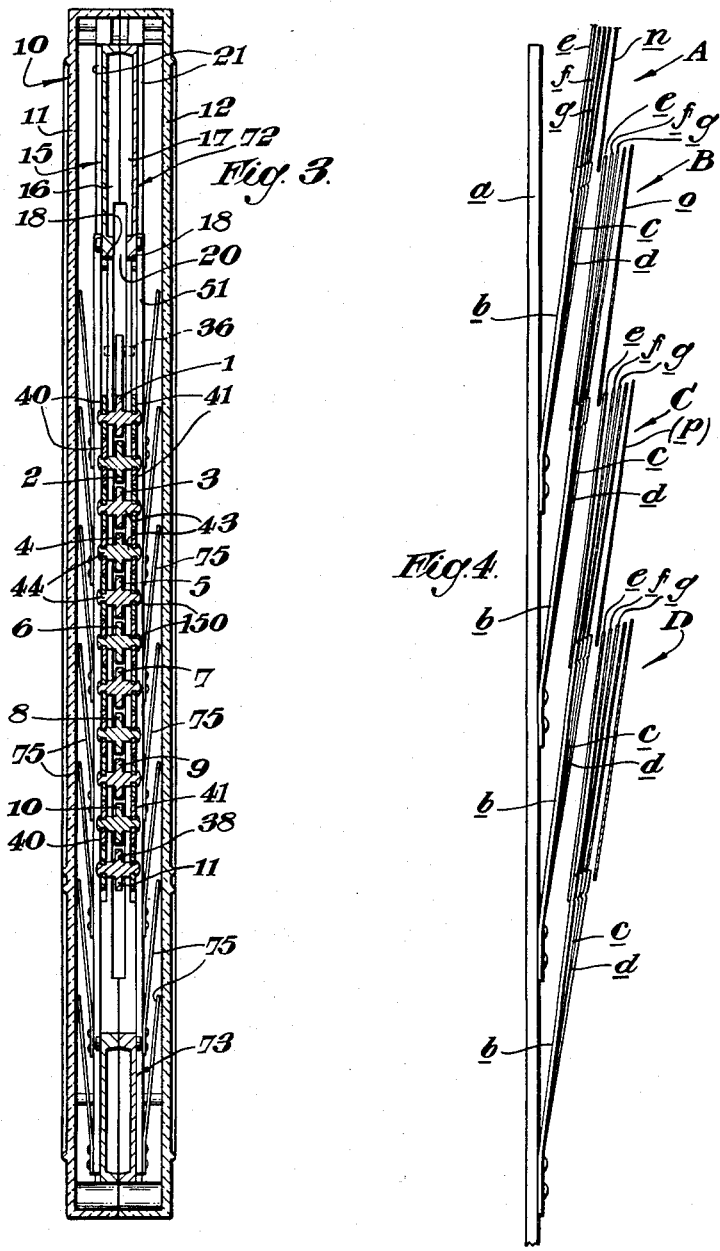
INVENTOR
IMRE LUCAS
BY
ATTORNEY

United States Patent Office 3,191,326
Patented June 29, 1965

3,191,326
AUTOMATIC MAPS
Imre Lucas, Lynn, Crowborough, Sussex, England
Filed May 21, 1963, Ser. No. 281,867
Claims priority, application Great Britain, May 24, 1962,
20,018/62
4 Claims. (Cl. 40—65)

This invention concerns improvements in or relating to automatic maps of the kind (hereinafter referred to as of the kind described) in which a series of separate map sheets showing different map regions are assembled one behind the other, each map sheet being composed of a plurality of strip elements which are arranged parallel with one another, the strip elements of each map sheet being attached to a pair of carrier strips with the strip elements extending transversely of the carrier strips in their proper positional relationship, there being a pair of carrier strips for each map sheet, the carrier strips being assembled side by side in substantially parallel relationship, and manually operable shifting means being provided for longitudinally shifting the carrier strips of each map sheet with respect to the other carrier strips, the manually operable shifting means being operable in a predetermined sequence to expose to view in turn their associated map sheet.

It is already known to provide an automatic map of a kind described in which each shifting means takes the form of a lever pivoted to a framework structure for the map mechanism, the lever also being pivotally connected with a shifting member disposed transversely of and fixed to the carrier strips whereby movement of the lever shifts the carrier strips longitudinally.

According to the present invention there is provided an automatic map of the kind described having shifting means as just described in which the carrier strips of each pair of carrier strips are substantially equi-spaced from the pivot point of the lever with their shifting member, the strips being disposed one to each side of said pivot point.

According to a feature of the present invention, the pairs of carrier strips are disposed side by side so as to guide one another for longitudinal movement.

According to a further feature of the present invention the carrier strips of each pair of carrier strips are arranged, in the predetermined sequence in which they are moved by manipulation of the pivoted levers, at a progressively greater or a progressively lesser spacing with respect to one another.

The pivoted levers may be common each to a pair of said shifting members which are pivoted to opposite sides of the lever, the two shifting members of each pair forming parts of different automatic map mechanisms, the carrier strips on one of the shifting members carrying the strip elements of one sheet of one set of map sheets manipulated by one of the automatic map mechanisms, and the carrier strips on the other of the shifting members carrying the strip elements of one sheet of another set of map sheets manipulated by the other of the automatic map mechanisms. In this case, according to a further feature of the present invention, the carrier strips of the pairs of carrier strips attached to each pair of shifting members are disposed at a different spacing. Thus preferably, all the pairs of carrier strips on one side of the pivoted levers are arranged, in the predetermined sequence in which they are moved by manipulation of the pivoted levers, at a progressively greater spacing, and all the pairs of carrier strips on the other side of the pivoted levers are arranged, in the predetermined sequence in which they are moved by the aforesaid manipulation, at a progressively lesser spacing.

According to a still further feature of the present invention, the strip elements composing the map sheets are attached to their carrier strips in uniform positions and the pairs of carrier strips are fixed to the shifting members in longitudinally staggered relationship whereby the strip elements of each map sheet when moved so as to be exposed to view have their visible transverse edges displaced from the corresponding edges of the strip elements of the immediately underlying map sheet in the direction of movement. This ensures that the previously viewable map sheet is completely covered each time a subsequent map sheet is brought into view.

Figure 2:
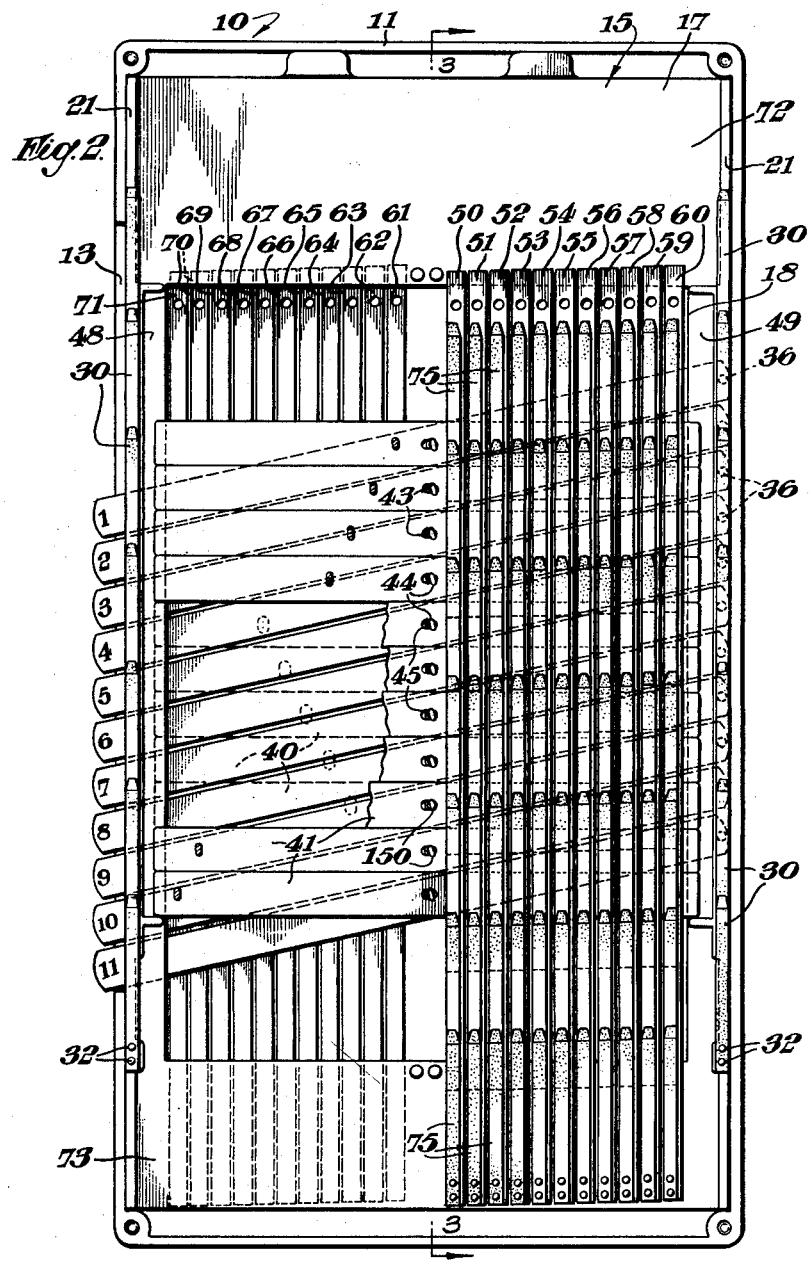

A specific embodiment of automatic map incorporating the above described and still further features of the present invention will now be described in detail merely by way of example and with reference to the accompanying drawings in which:

FIG. 1 is a front elevation of the map with certain parts broken away to show details of construction, FIG. 2 is a view corresponding with FIG. 1 but with one half of the casing of the map removed, the map strip elements being also omitted and certain parts being broken away — all to show details of the construction of the automatic mechanism of the map, FIG. 3 is a cross-section on line 3—3 in FIG. 2, and FIG. 4 is a diagram showing the arrangement of the strip elements.

The map comprises a flat rectangular box-like casing 10 moulded from synthetic plastics material and formed in two halves 11 and 12 joined in a plane parallel to the planes of the two map sheet sets hereinafter described. One long side of the casing has a slot 13 formed between the casing halves. The purpose of this is hereinafter described.

Within the casing and located between lugs on the casing halves is received a flat rectangular framework 15 which is likewise moulded from synthetic plastics material and formed in two shallow dish-like parts 16, 17 joined in the joint plane of the casing halves. The framework 15 carries the map mechanisms which nevertheless have common manually operable shifting means as hereinafter explained. The two parts 16, 17 of the framework each have a correspondingly positioned rectangular aperture 18 in their floors, the dished framework parts being joined "wall-to-wall" so that their apertured floors are spaced from one another as at 20, the framework parts also forming a box.

To the outside of the framework box and along each long side of each aperture is provided a flat topped rib 21 spaced from the adjacent parallel aperture edge 22 and running the full length of the framework. Attached to the pair of these ribs on each side of the framework 15 are seven fixed strip elements 23, 24, 25, 26, 27, 28 and 29 which together compose a fixed map sheet.

The fixed strip elements extend transversely across the apertures 18, being secured to the ribs 21 by elongated fibre tabs 30 which are arranged in line along the ribs, the first overlapping the second and so on down the line. The tabs 30 are fixed to the ribs 21 each at one end by upstanding studs 32 moulded integrally on the ribs and entered through holes in the tabs, the studs subsequently being "riveted" over using heat and pressure. The free ends of the tabs 30 are secured by adhesive as at 34 to the fixed strip elements, all but the first tab 30 on each rib at the lower end in FIG. 1 being covered by the strip elements the first of which likewise overlaps the second and so on up the length of the framework in FIG. 1.

Between the framework parts 16, 17 are arranged eleven oblique levers numbered 1 to 11 as shown in FIGS. 1 and 2. Each lever is pivoted at one end (the right hand end in the figures referred to) by pivot pins 36 received in aligning bores in a pair of the long walls of the framework parts 16, 17. The levers are moulded from synthetic plastic material complete with the pivot pins which are located in the aligning bores when the two parts 16, 17 of the framework 15 are brought together.

The levers 1 to 11 extend across the apertures 18 and through a slot 38 formed between the other pair of long walls of the framework parts 16, 17 the free ends of the levers projecting through the slot 13 in the casing as shown in FIG. 2.

At a point mid-way of the width of the apertures 18 each of the levers is pivotally connected with a pair of shifting members 40, 41 one on each side of the lever. To this end, the levers have integrally moulded bosses 43 with upstanding pivot pins 44 which are received in slots 45 in the shifting members. The shifting members extend transversely of the apertures 18 on the outside of the framework 15, the shifting members being each supported by a pair of slide surfaces 48, 49 inward of the ribs 21 carrying the fixed strip elements composing the fixed map sheets. The pivot pins 44 for the shifting members 40, 41 are entered through the slots 45 in the shifting members during assembly of the map and the pins then deformed under heat and pressure to form heads 150 holding the shifting members in position.

Attached to each shifting member 40, 41 is a pair of parallel carrier strips of which one is indicated respectively by the reference numerals 50 to 71 in FIG. 2. The carrier strips are composed of synthetic plastics material, these strips being positioned one to each side of their lever/shifting member pivot 44 so as to be substantially equi-spaced from the pivot. Thus the strip paired with strip 50 is disposed opposite strip 61 which is on the far side of the framework in FIG. 2, the strip paired with strip 51 is disposed opposite strip 62 which is on the far side of the framework in FIG. 2 and so on, strip 61 being paired with a strip immediately behind strip 50 on the far side of the framework and so on. The carrier strips extend at right angles to the shifting members and lengthwise of the apertures 18 in the framework parts 16 and 17, that is to say, parallel with the ribs 21 on the framework parts.

The carrier strips bridge the apertures 18 and are supported at each end on flat sliding surfaces 72, 73 on the framework above and below the apertures.

Each pair of carrier strips on each side of the framework can be shifted longitudinally by movement of the appropriate lever, the pairs of carrier strips on each side of the framework being disposed in side by side relation as shown in FIG. 2 so as to guide one another for longitudinal movement.

The pairs of carrier strips, like the ribs previously described, carry a plurality of map strip elements which together compose a map sheet. The map strip elements are mounted on the carrier strips by fibre tabs 75 arranged and fixed as previously described for the ribs 21, the map strip elements being glued to the ends of the tabs 75 in the manner previously described.

The map strip elements of each map sheet are arranged on their pair of carrier strips in proper relationship to one another and the map sheets are all assembled on the framework one behind the other so that the strip elements of the sheets form a series of stacks or piles of map elements, each element in any one stack being carried by a different pair of the carrier strips. This is diagrammatically illustrated in FIG. 4 where $a$ represents one of a pair of the carrier strips and $b$ the tabs on that strip. The tabs on different strips are diagrammatically illustrated at $c, d$ .... The stacks of map elements are indicated at A, B, C ..., and in these stacks the strip elements $e, e, e \ldots f, f, f \ldots g, g, g \ldots$ together make up the different map sheets.

In the initial position illustrated in the drawings, the stack of strip elements A is concealed in the casing 10 beneath the second strip eleemnt $n$ of the fixed map sheet, that is the strip element which is next to the fixed strip element $m$ at the top of the fixed map sheet, the strip elements in the first stack A being those which form the tops of the movable map sheets.

The second stack B of movable strip elements is likewise concealed, beneath the third fixed strip element $o$, and so on, the last stack of movable strip elements $g$ being concealed in the casing 10 to the lower side of a window 90 in FIG. 1 through which the fixed map sheet is exposed.

When the first lever 1 is swung up in FIG. 2, the lowermost strip section $e$ in each stack A, B, C ... is moved, from the first stack A so as to cover over the first fixed strip element $m$, from the second stack B so as to cover over the second fixed strip element $n$ and so on, the lowermost strip elements $e$ in each stack A, B, C ... then joining together to form the next subsequent map sheet.

Subsequent movement of the ensuing levers 2, 3, 4 ... moves the ensuring strip sections $f$, each time from the bottom of the stacks of the strip sections, so as to cover the preceding strip sections and join together to expose the succeeding map sheets to view.

The pairs of carrier strips 50 ... 60 on one side of the framework are arranged, in the sequence in which they are moved by manipulation of the levers 1 to 11, at a progressively greater spacing, and the pairs of carrier strips 61 ... 71 on the other side of the framework are arranged in the order in which they are moved by the aforesaid manipulation, at a progressively lesser spacing.

Thus on one side of the framework 15 the first lever 1 moves the two centre carrier strips 50, the second lever moves the two carrier strips immediately to each side of the two central carrier strips and so on, whereas on the other side of the framework the first lever moves the two outermost carrier strips 71, the second lever moves the two carrier strips disposed immediately next to the two outer carrier strips and so on.

Since the two carrier strips attached to each of the shifting members 40 or 41 are equi-spaced from the pivotal connection 44 of the shifting member with its lever, the forces imposed upon the shifting member are balanced and no torque is set up on the shifting member tending to turn it about its pivot with the lever. Since the carrier strips guide one another for longitudinal movement, and each is attached to a pivoted shifting member, out of balance forces on the shifting members can lead to lop-sided movement of the carrier strips and this is avoided by the arrangement which has been described, the arrangement achieving a proper dynamic balance of the mechanism.

The strip elements of the various map sheets are attached to their carrier strips in uniform positions, and the pairs of carrier strips are fixed to the shifting members in longitudinally staggered relationship as shown in FIG. 2, the top edges of the carrier strips on the side of the framework on which the strips are moved in succession from the centre outwardly being progressively displaced upwardly from the centre to the outside, and the converse arrangement being adopted for the carrier strips on the other side of the framework.

The staggering of the carrier strips in the manner described leads to a staggering of the strip elements $e, f, g \ldots$ in the stacks A, B, C ... of strip elements whereby the free edge of the top element in the stack is displaced beyond the free edge of the immediately underlying strip element in the direction of movement of the strip elements and so on down the stack. Thus, when each set of strip elements is moved by manipulation of the appropriate lever, the strip elements are moved to an extent which more than covers the exposed edges of strip elements previously exposed to view.

This leads to a small margin of safety ensuring that each subsequent map section fully covers the previous map section when the levers are manipulated.

Because of the staggered relationship described each carrier strip/shifting member assemblage has a unique position in the mechanism, and these assemblages are therefore provided with a serial number in the process of manufacture so as to avoid errors and to facilitate and speed up assembly and/or repair.

The part 99 (see FIG. 1) of the outer casing on each side is used to accommodate an index or reference to the different maps, e.g. a small scale map divided by a grid to indicate the areas of the map sheets, the index being attached to the outside of the casing by gluing for example and, conveniently, being covered by a thin transparent protective sheet of plastics material which may be fixed by the welding over of studs on the casing, the studs passing through holes in the transparent sheet.

What I claim is:

1. An automatic map comprising a framework structure, a map mechanism located in said structure and including a series of separate map sheets showing different map regions, each map sheet being composed of a plurality of strip elements arranged parallel with one another, a pair of carrier strips for each map sheet to which said strip elements of the sheet are attached so as to extend transversely of said carrier strips in their proper positional relationship, all such carrier strips being assembled side by side in parallel relationship so as to guide one another for longitudinal movement, and shifting members disposed transversely of and fixed one to each pair of carrier strips, and levers pivoted to one side of said structure, each having a pin-and-slot form of pivotal connection to a respective one of said shifting members, and projecting from the other side of said structure for manual operation to shift longitudinally the respective pair of carrier strips relative to the other carrier strips in a predetermined sequence to expose to view the associated map sheet, and wherein said carrier strips of each pair of carrier strips are equi-spaced one to each side of said pivotal connection of their shifting member to the respective lever so that the forces imposed on each shifting member are balanced to avoid torque on said shifting member about said pivotal connection.

2. An automatic map comprising a framework structure, substantially duplicate map mechanisms located in said structure back to back and each including a series of separate map sheets showing different map regions, each map sheet being composed of a plurality of strip elements arranged parallel with one another, a pair of carrier strips for each map sheet to which said strip elements of the sheet are attached so as to extend transversely of said carrier strips in their proper positional relationship, all such carrier strips being assembled side by side in parallel relationship so as to guide one another for longitudinal movement, and shifting members disposed transversely of and fixed one to each pair of carrier strips, and levers pivoted to one side of said framework each having a pin-and-slot form of pivotal connection to a pair of said shifting members each to opposite faces of the lever and included one in each of said map mechanisms and projecting from the other side of said framework for manual operation to shift longitudinally the respective pairs of carrier strips relative to the other carrier strips in a predetermined sequence to expose to view the associated map sheet of each map mechanism, and wherein said carrier strips of each pair of carrier strips are equi-spaced one to each side of said pivotal connection of their shifting member to the respective lever so that forces imposed on each shifting member are balanced to avoid torque on said shifting member about said pivotal connection.

3. An automatic map according to claim 2 wherein all said pairs of carrier strips of one map mechanism are arranged at a progressively greater spacing, and all said pairs of carrier strips of the other map mechanism are arranged to a progressively lesser spacing, in the predetermined sequence in which they are moved by manipulation of said levers, such that the distribution of forces about said pivotal connections for each lever is susbtantially equivalent to that for each other lever.

4. An automatic map as claimed in claim 2 wherein for each of said map mechanisms the strip elements composing the map sheets are attached to their carrier strips in uniform positions and the pairs of carrier strips are fixed to the shifting members in longitudinally staggered relationship whereby the strip elements of each map sheet when moved so as to be exposed to view have their visible transverse edges displaced from the corresponding edges of the strip elements of the immediately underlying map sheet in the direction of movement.

References Cited by the Examiner
UNITED STATES PATENTS

| | | | |
|---|---|---|---|
| 2,117,187 | 5/36 | MacLaren | 40—62 |
| 2,141,398 | 12/38 | Lowenstein | 40—65 |

JEROME SCHNALL, *Primary Examiner.*